United States Patent [19]

Malik

[11] Patent Number: 5,991,377
[45] Date of Patent: *Nov. 23, 1999

[54] SYSTEM AND METHOD FOR MANIPULATING DATA FIELDS IN A CALL STRUCTURE FOR SYNCHRONIZING BILLING INFORMATION AND RETAINING ORIGINAL CALLING PARTY INFORMATION

[75] Inventor: Dale W. Malik, Atlanta, Ga.

[73] Assignee: BellSouth Intellectual Property Corporation, Wilmington, Del.

[ * ] Notice: This patent issued on a continued prosecution application filed under 37 CFR 1.53(d), and is subject to the twenty year patent term provisions of 35 U.S.C. 154(a)(2).

[21] Appl. No.: 08/909,417

[22] Filed: Aug. 11, 1997

[51] Int. Cl.⁶ .................................................. H04M 15/00
[52] U.S. Cl. ........................ 379/114; 379/115; 379/207; 379/211; 379/221
[58] Field of Search ........................... 379/111–115, 121, 379/126, 127, 134, 226, 229, 230, 207, 220, 221

[56] References Cited

U.S. PATENT DOCUMENTS

| | | | |
|---|---|---|---|
| 5,414,759 | 5/1995 | Ishikuri et al. | 379/212 |
| 5,572,583 | 11/1996 | Wheeler et al. | 379/207 |
| 5,598,464 | 1/1997 | Hess et al. | 379/213 |
| 5,748,724 | 5/1998 | Sonnenberg | 379/212 |
| 5,757,894 | 5/1998 | Kay et al. | 379/114 |
| 5,854,836 | 12/1998 | Nimmagadda | 379/207 |
| 5,867,569 | 2/1999 | Martinez et al. | 379/207 |
| 5,881,145 | 3/1999 | Giuhat et al. | 379/207 |
| 5,887,056 | 3/1999 | Sonnenberg | 379/221 |

*Primary Examiner*—Curtis A. Kuntz
*Assistant Examiner*—Binh K. Tieu
*Attorney, Agent, or Firm*—Nora M. Tocups, Esq.; James L. Ewing, IV, Esq.; Kilpatrick Stockton LLP

[57] ABSTRACT

A system and method for synchronizing billing information and maintaining original calling party information when providing an enhanced communication service. A communication is received from a first network element and directed to a feature access code. In connection with the communication, a string of data is received containing call information for correction of parameters of a call structure. In response to receiving the communication directed to the feature access code, the string of data is manipulated within the parameters of the call structure based on instructions provided by a database, whereby original calling party information located in the call structure is retained and billing information is ultimately synchronized with an associated subscriber. Advantageously, the tasks of synchronizing billing information and maintaining call origination are accomplished by providing a standard format for processing long strings of data representing information on how a call is to be configured and by reformatting the data fields based on this information so that the final call structure resembles that of the original call structure.

13 Claims, 4 Drawing Sheets

Fig_1

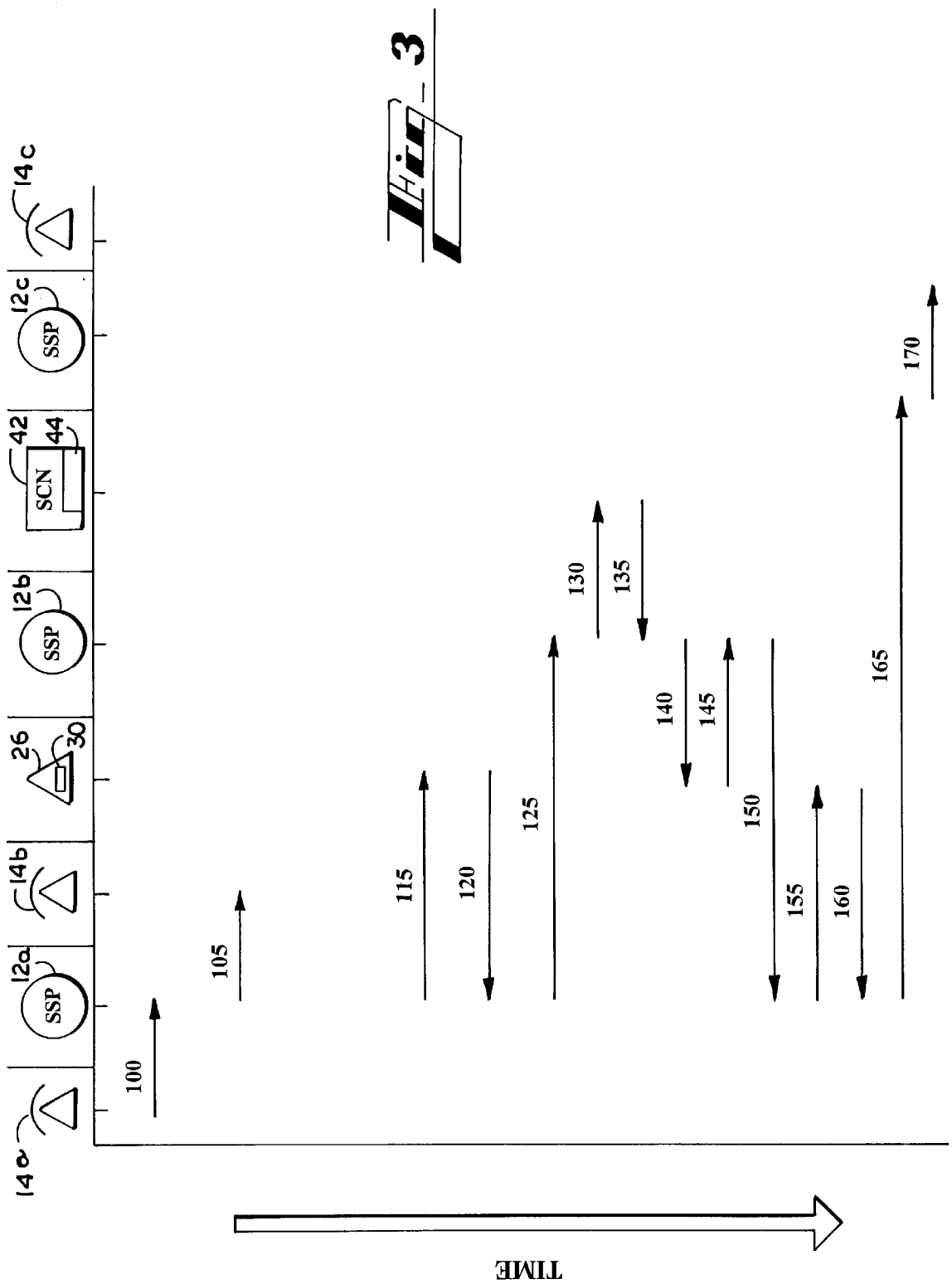

INITIAL CALL SETUP INFORMATION IN THE SWITCH (12a)
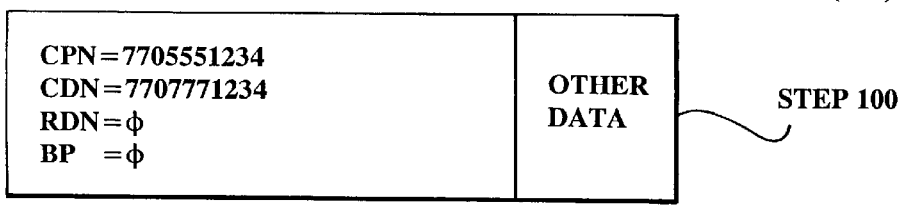
ISUP MESSAGE
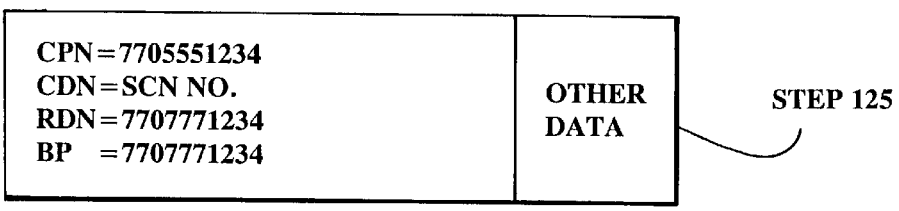
TCAP MESSAGE
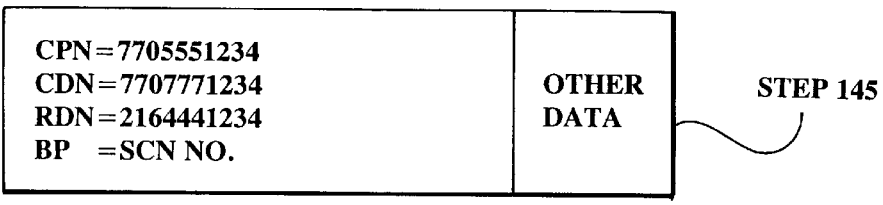
TCAP MESSAGE
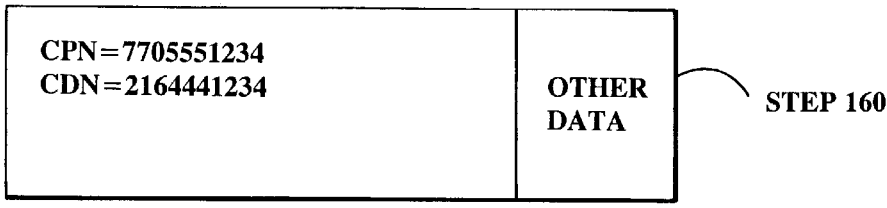
CPN = DIALING PARTY NUMBER   BP = BILLING PARTY
CDN = CALLED PARTY NUMBER
RDN = REDIRECT NUMBER

SYSTEM AND METHOD FOR MANIPULATING DATA FIELDS IN A CALL STRUCTURE FOR SYNCHRONIZING BILLING INFORMATION AND RETAINING ORIGINAL CALLING PARTY INFORMATION

TECHNICAL FIELD

The present invention relates generally to telecommunications systems, and more particularly, relates to a system and method for manipulating data fields in a call structure to aid in reconciling subscriber billing and retaining original calling party information.

BACKGROUND OF THE INVENTION

A wide variety of enhanced communications services are available to a user of a modern public switched telephone network (PSTN). These services include voice mail, audio name screening, flexible call forwarding (FCF), and deluxe calling name delivery. These services are considered valuable services by many users because they enhance conventional telephone service. For example, when FCF is activated by a subscriber/called party, FCF automatically forwards an incoming call from a calling party to terminating equipment associated with a directory number that the called party has chosen. In another example, audio name screening allows a subscriber/called party to hear the name of the calling party before answering the call. Unfortunately, providing these types of services creates billing problems, as well as call origination problems, that are time-consuming and cumbersome to reconcile on the part of a telecommunication service provider. Providing enhanced communications services would be considered much simpler and more efficient to the telecommunication service provider if billing could be automatically reconciled while also maintaining original calling information.

Today, special handling of a call or communication is typically necessary for an enhanced communications service that requires call supervision or an announcement to a subscriber's telephone line. Specifically, special handling of the call includes routing the call to a separate system or network element, such as a service node. The service node then handles the remainder of the call by interrupting the normal call flow from the calling party to the called party, implementing the subscriber's service, and reoriginating the call on the service node for completion of the call to the called party or other designated location.

One problem encountered by the service provider is that the reorigination of the call from the service node creates a separate billing to the service node instead of the subscriber of the service. The call effectively terminates at the service node due to the nature of the network element and instructions provided by another network element. In essence, a second call originates from the service node to complete the call process. Data fields in a call structure change to accommodate the new call, thereby changing a calling party parameter from the original calling party to that of the service node and a called party parameter to that of the redirect party number. Consequently, billing information is no longer matched with the subscriber. Hence, the service provider must maintain records of the calls originating from the service node, as well as the subscriber information, to reconcile the billing of services and calls with the appropriate subscribers.

To do so, can be very time-consuming and difficult for the service provider. Such a task is likely to require multiple databases and complex programming to perform the synchronization of data. In addition, a mechanism must remain in place to monitor and track the use of services by the subscribers. Further, due to the complexity of synchronizing billing information and the need for additional equipment to address this problem, the service provider is likely to unavoidably incur additional costs and expenses, which are likely to be passed on to the subscriber.

Another problem that occurs due to reorigination of the call on the service node is the call appears as if it originated at the service node as opposed to a calling line of the calling party. As previously mentioned, the data fields in the call structure change the calling party parameter to that of the service node. Hence, original calling party information is ruined. For example, if a called party subscribed to deluxe caller identification, the caller ID display unit would not provide proper identification of the originating caller. The prior art system has no procedure for rectifying this problem.

Furthermore, the current system is limited to sending and processing approximately twenty digits of data in a string. To correct the above-mentioned problems, data strings would have to be longer and the system would have to be capable of processing the long strings of data. Consequently, this limitation prohibits providing instructions for reformatting data fields so that call origination can be preserved, as well as providing a means for billing information synchronization without interrupting and reoriginating the call.

Therefore, there is a need for a system and method that provides automatic synchronization of billing information so that a subscriber can be directly billed for use of an enhanced communication service.

In addition, there is a need for a system and method that provides a means for reducing the number of databases and equipment necessary to reconcile billing information while improving efficiency and creating simplicity.

There is also a need for a system and method that provides a means for resolving call origination problems.

There is a further need for a system and method that provides a standard format for processing long strings of data representing information on how a call is to be configured for the synchronization of billing information and for maintaining call origination.

Finally, there is a need for a system and method that reduces the costs incurred by the service provider for synchronization of billing information.

SUMMARY OF THE INVENTION

The present invention solves the above-described needs by providing a system and method for synchronizing billing information and maintaining original calling party information when providing an enhanced communication service. The present invention employs data manipulation techniques to synchronize billing information without interrupting and reoriginating the call. For purposes of this discussion, the terms "data" and "string of data" can represent any information that can be transmitted within the call structures of an AIN system and can be in the form of digits, characters, symbols, and so forth or any other suitable form recognized by those skilled in the art.

Advantageously, the present invention is designed to automatically synchronize billing information so that a subscriber can be directly billed for use of an enhanced communication service. In addition, the present invention reduces the number of databases and equipment necessary to reconcile billing information while improving efficiency and creating simplicity. Consequently, the present invention reduces the costs incurred by the service provider for synchronization of billing information. Moreover, the present invention provides a means for resolving call origination problems. Specifically, the present invention provides a standard format for processing long strings of data representing information on how a call is to be configured for the synchronization of billing information and for maintaining call origination.

Generally described, the present invention provides a method for synchronizing billing information and maintaining original calling party information when providing an enhanced communication service. A communication is received from a first network element and directed to a feature access code. In connection with the communication, a string of data is received containing call information for correction of parameters of a call structure. In response to receiving the communication directed to the feature access code, the string of data is manipulated within the parameters of the call structure based on instructions provided by a database, whereby original calling party information located in the call structure is retained and billing information is ultimately synchronized with an associated subscriber.

With respect to the embodiment described in the immediately preceding paragraph, the parameters can include a calling party number, a called party number, a redirect number, a service node number, and a billing party number. In addition, the string of data are typically assembled within a data assembly interface of the first network element and are transmitted along with the feature access code. Also, the string of data is manipulated typically by populating the call information into the parameters of the call structure in accordance with the instructions provided by the database.

In another embodiment of the present invention, a computer-readable medium for manipulating parameters of a call structure is provided, wherein a feature access code within a string of data is assembled. The string of data also contains call information for correction of the parameters in the call structure. With respect to a communication, the string of data is transmitted to a first network element, where the feature access code triggers a database containing instructions for reassembling the call information. The call information is then reassembled based on the instructions for reassembling the call information contained within the database. Consequently, the original calling party information located in the call structure is retained and billing information is ultimately synchronized with an associated subscriber.

With respect to the embodiment described in the immediately preceding paragraph, the call information typically comprises a subscriber telephone number, a redirect number, and a calling party number.

In another embodiment of the present invention, a system for synchronizing billing information and maintaining original calling party information when providing an enhanced communication service is provided, wherein a first network element is operative to assemble a string of data within a data assembly interface located within the first network element. The string of data contains a feature access code and call information for correction of parameters within a call structure. The first network element is further operative to transmit the string of data to a second network element. The second network element is operative to receive the communication directed to the feature access code. In response to receiving the communication directed to the feature access code, the second network element is further operative to acknowledge the transmission of the call information for correcting the parameters within the call structure based on the recognition of the feature access code. In response to recognizing the feature access code, the second network element is further operative to manipulate the call information by populating the call information into the parameters of the call structure based on instructions provided by a database located within the second network element. As a result, the original calling party information located in the call structure is retained and billing information is ultimately synchronized with an associated subscriber.

With respect to the embodiment described in the immediately preceding paragraph, the first network element is preferably a service circuit node and the second network element is preferably a service control point.

In summary, the present invention provides a system and method for automatic synchronization of billing information so that a subscriber can be directly billed for use of an enhanced communication service. In addition, the present invention reduces the number of databases and equipment necessary to reconcile billing information while improving efficiency and creating simplicity. The present invention also provides a system and method for resolving call origination problems. Advantageously, the tasks of synchronizing billing information and maintaining call origination are accomplished by providing a standard format for processing long strings of data representing information on how a call is to be configured and by reformatting the data fields based on this information so that the final call structure resembles that of the original call structure.

These and other objects, features, and advantages of the present invention may be more clearly understood and appreciated from a review of the following detailed description of the disclosed embodiments and by reference to the appended drawings and claims.

BRIEF DESCRIPTION OF THE DRAWINGS

FIG. 3 is a time diagram illustrating an exemplary method of operation of the present invention.

FIG. 4, consisting of FIGS. 4a–4d, illustrates various call set-up, ISUP, and TCAP messages with reorganized data fields in accordance with the exemplary embodiment of the present invention.

DETAILED DESCRIPTION

Figure 1:
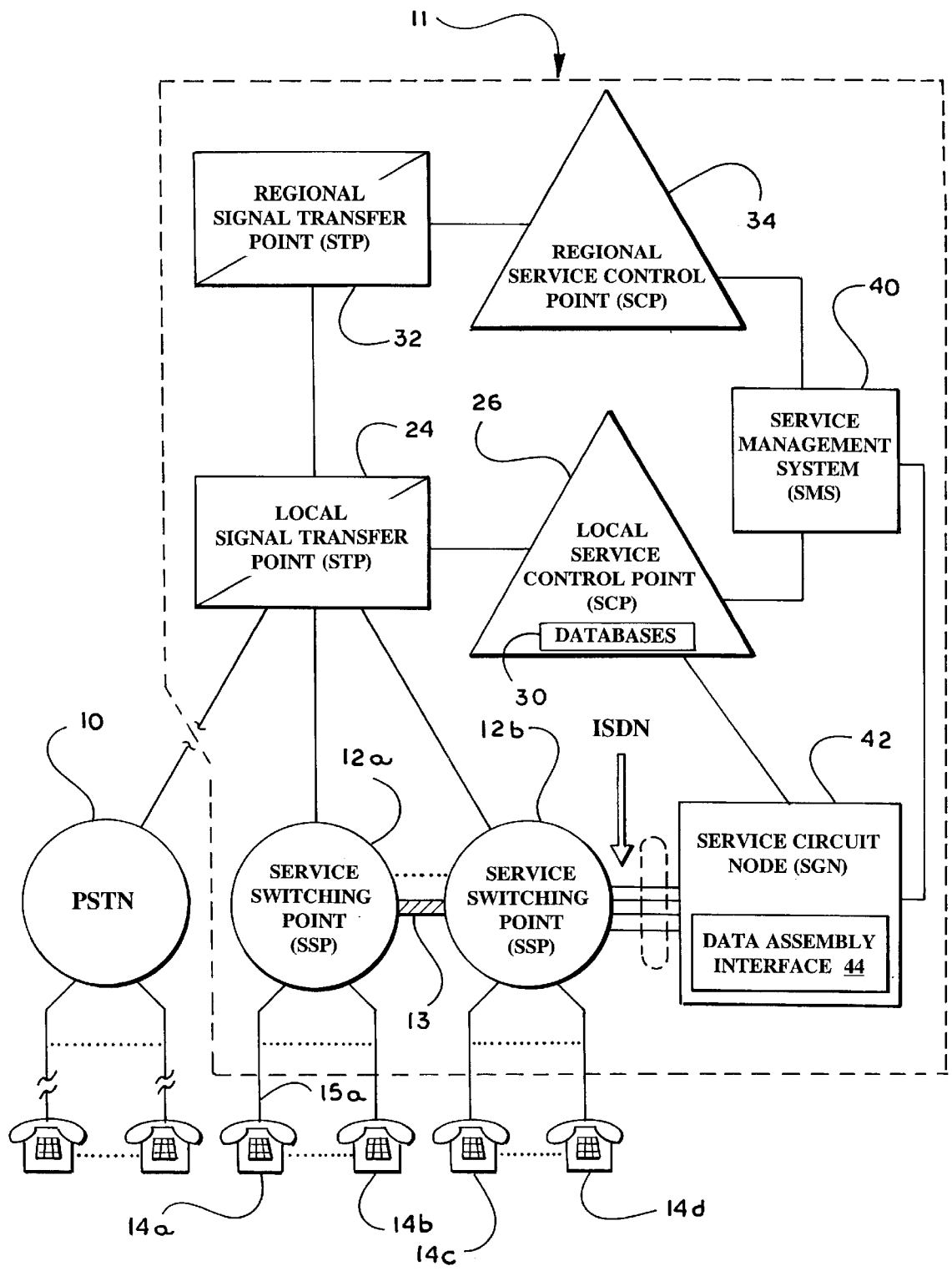
FIG. 1 is a diagram of an exemplary environment for operation of the present invention.

The present invention is directed to a system and method for manipulating data fields in a call structure so that original calling party information is maintained and enhanced service routing charges are automatically synchronized with the subscriber. Data is manipulated during various stages of call processing so as to maintain the integrity of the call structure. Specifically, when enhanced communication services are provided, the present invention implements a data field reformatting technique that restructures call data without disrupting normal call flow so that it appears as if a service node was not involved in the call process. Consequently, any billing for a call is then appropriately charged directly to the subscriber's number and the calling party information is retained.

Referring now to the drawings, in which like numerals represent like elements throughout the several figures, aspects of the present invention and exemplary operating environments will be described.

Exemplary Operating Environment Overview of AIN Elements

FIG. 1 is a diagram of an exemplary embodiment and exemplary environment for operation of the present invention. This exemplary environment is the public switched telecommunication network (PSTN) 10. A portion 11 of the PSTN is illustrated in FIG. 1 and described generally below. In particular, the detailed portion 11 of the PSTN illustrates a part of the Advanced Intelligent Network (AIN) of a typical local exchange carrier. For brevity, only a basic explanation of the PSTN 10 is provided herein. Where the PSTN 10 operates or is composed differently in an important aspect from that which would be understood by those skilled in the art, additional details are provided herein. For further information regarding the referenced PSTN 10 and AIN aspects thereof, the interested reader is referred to the patent to Weisser, U.S. Pat. No. 5,430,719, which is incorporated herein by reference.

The AIN includes a variety of interconnected network elements. A group of such network elements includes the plurality of central offices which are indicated as service switching points (SSPs) 12a, 12b in FIG. 1. An SSP is a switch and the terms are used interchangeably herein. As further illustrated in FIG. 1, the SSPs 12a, 12b have a plurality of subscriber lines connected thereto. A subscriber line may also be referred to as a calling line. Each SSP serves a designated group of calling lines, and thus, the SSP or switch that serves a particular calling line may be referred to as its serving switch. Each calling line is connected typically to a piece of terminating equipment including a plurality of telephones commonly designated as 14. Although telephones are illustrated as the pieces of terminating equipment in FIG. 1, those skilled in the art will understand that such pieces include other telecommunication devices such as facsimile machines, computers, modems, etc.

Pursuant to the preferred embodiment, each active calling line in an AIN is assigned a ten digit calling line number. In the description of the present invention, the term "calling line number" is used in its generally understood meaning to be the number which is dialed or input by a caller or source to reach a piece of terminating equipment on a calling line associated with the dialed calling line number. A calling line number is commonly referred to as a telephone number or a directory number.

Referring again to FIG. 1, SSPs 12a, 12b are interconnected by a plurality of trunk circuits 13. These are the voice path trunks that interconnect the SSPs to connect communications. The term "communication" or "call" is used herein to include all messages that may be exchanged between caller and called party in the network illustrated in FIG. 1. Each of the SSPs 12a, 12b is connected to another type of AIN element referred to as a local signal transfer point (STP) 24 via respective data links. Currently, these are data links employing a signaling protocol referred to as Signaling System 7 (SS7), which is well known to those skilled in the art. Much of the intelligence of the AIN resides in yet another type of AIN element referred to as a local service control point (SCP) 26 that is connected to STP 24 over a SS7 data link. Among the functions performed by the SCP 26 is the maintenance of network databases and subscriber databases as represented collectively by databases 30. These databases may be used in providing temporary telecommunication services to a customer. Typically, the SCP 26 is also the repository of service package applications (SPAs) that are used in connection with or as part of the databases 30 in the application of telecommunication services or enhanced features to calling lines.

As used herein, the phrase "telecommunication services" refers to features or enhancements that are provided by a telecommunication service provider to a customer in addition to conventional telephone service through the PSTN. A telecommunication service to which a customer subscribes in a conventional manner is typically subscribed to on an open ended basis so long as the customer pays for the service.

Referring again to FIG. 1, the local STP 24 may be connected to other network elements of the PSTN 10 through a regional STP 32, which in turn, may be connected to a regional SCP 34. Both regional SCP 34 and local SCP 26 are connected via respective data links to a service management system (SMS) 40. The SMS 40 interfaces to business offices of the local exchange carrier and interexchange carriers.

In order to keep the processing of data and calls as simple as possible, a relatively small set of triggers is defined at the SSPs for each call. A trigger in the AIN is an event associated with a particular calling line that generates a packet to be sent to an SCP. The trigger causes the SCP to query its database for processing instructions with respect to the particular call. The results of the database inquiry are sent back to the SSP in a response from the SCP 26 through STP 24. The return packet includes instructions to the switch as to how to process the call. The instructions may be to take some special action as a result of a customized calling service or enhanced feature. In response, the switch moves through its call states, collects the called digits, and generates further packets that are used to set up and route the call. Similar devices for routing calls among various local exchange carriers are provided by regional STP 32 and regional SCP 34.

As illustrated in FIG. 1, the AIN also includes a service circuit node 42 (SCN), which may also be referred to herein as a service node (SN). SCN 42 includes voice and dual tone multi-frequency (DTMF) signal recognition devices and voice synthesis devices. In addition, SCN 42 may include a data assembly interface 44 for use in connection with the present invention as is explained further below. SCN 42 is connected to the local SCP 26 via data link using an X.25 protocol and to the SMS 40 via a data link. In addition, SCN 42 typically is connected to one or more (but usually only a few) SSPs via Integrated Service Digital Network (ISDN) links as shown by the connection to SSP 12b.

Exemplary Operation

Figure 2:
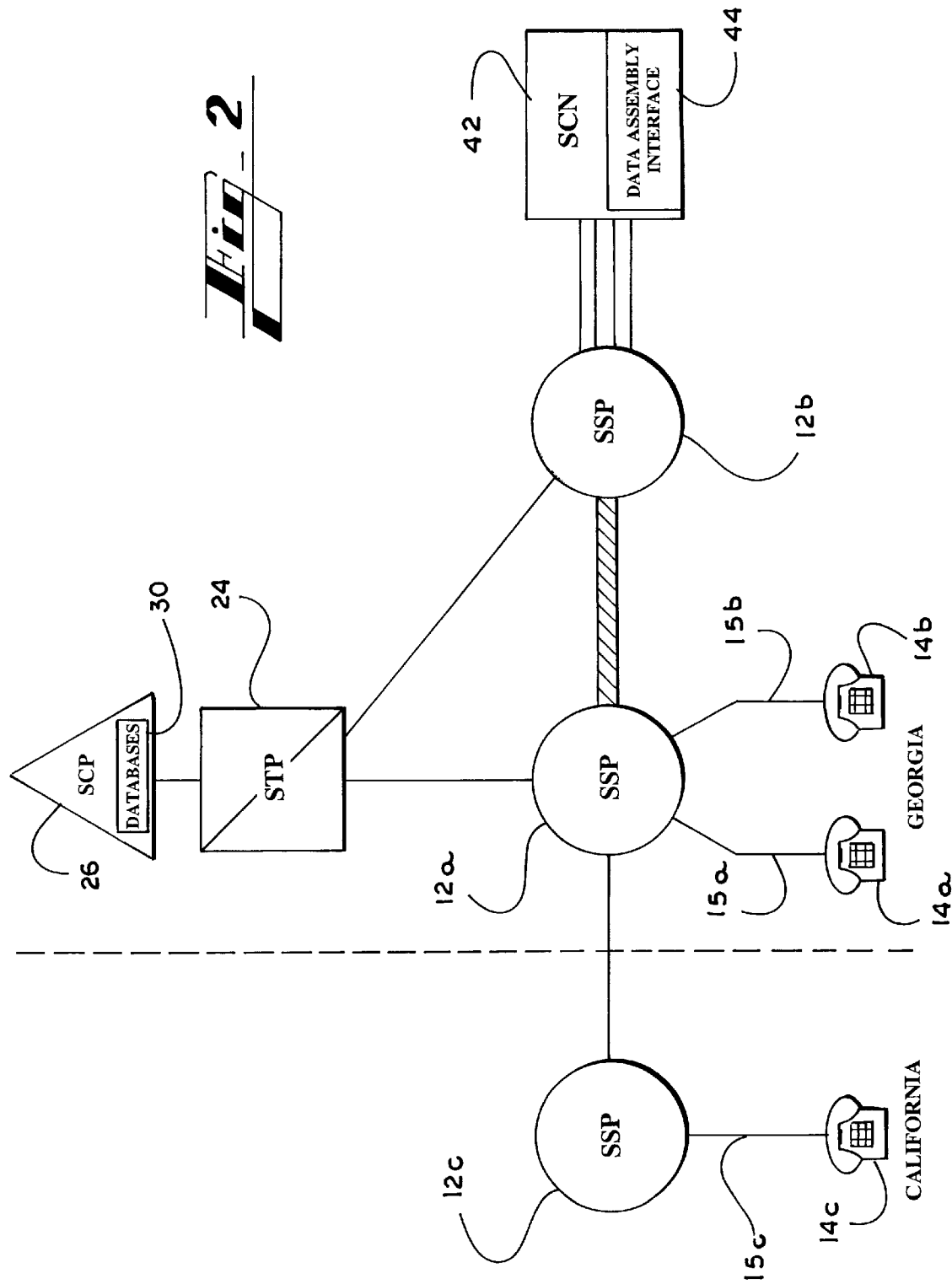
FIG. 2 is a diagram of an exemplary embodiment operating in the exemplary environment in accordance with the present invention.

With continuing reference to FIG. 1 and now turning to FIG. 2, the exemplary operation of the present invention is described in the context of a calling party placing a call to a called party/subscriber who has activated the flexible call forwarding (FCF) service and requested that all calls be sent to a location other than the subscriber's home. It will be appreciated by one skilled in the art that the present invention is not limited to use of FCF and audio name screening, but may also include other enhanced communication services such as voice mail, call waiting, call conferencing, and so forth.

In this example, a calling party ("Veda") having a calling party number (770-555-1234) uses her telephone 14a, which is connected by calling line 15a to SSP 12a. Veda places a call to the subscriber ("Dale") having a called party number (770-777-1234) associated with his telephone 14b. Dale's telephone 14b is connected by line 15b to SSP 12a. Dale has activated FCF so that all incoming calls are forwarded to the place where he is vacationing. Specifically, all incoming calls directed to Dale's telephone number are forwarded to his sister, Nora, who lives in another state and has a directory number (216-444-1234) associated with her telephone 14c. Nora's telephone 14c is connected by line 15c to SSP 12b.

As of a result of Dale activating FCF, the call from Veda to Dale encounters a Terminating Attempt (TAT) trigger defined at SSP 12a, which is set in association with FCF. Due to the trigger, the switch pauses in the processing of the call and obtains further instructions from other network elements. In this example, Veda's call is received in the SSP 12a. The SSP 12a pauses in the processing of the communication to request instructions from SCP 26 via STP 24. The SSP 12a provides the SCP 26 with information relating to the communication as a part of the SSP's query to the SCP 26, as well as routing information.

In response to the query provided by SSP 12a, SCP 26 identifies the subscriber by performing a search in database 30. Based on the called party number and the trigger type, database 30 indicates that the communication is to be routed to the service circuit node (SCN) 42, which is functionally attached to SSP 12b. Therefore, in the response, SCP 26 provides instructions to SSP 12a to route the communication to the SCN 42 via SSP 12b. SSP 12a then routes the communication to SSP 12b.

Upon receipt of the processing instructions from the SCP 26, the SSP 12b routes the communication in a conventional manner to the SCN 42. The SCN 42 receives an ISDN call set-up message from the subscriber's line. In addition, the SCN 42 locates the records of the subscriber (Dale) in a database (not shown) and extracts the location to route the call. In this example, the call is to be routed to Nora's telephone 14c.

At this stage, one prior art method of providing an enhanced communication service requires the SCN 42 to reoriginate the call from the SCN 42 to the forwarded directory number. By doing so, the data fields change to reflect a new calling party, which is SCN 42, and the SCN 42 is billed for the call. This prior art method not only creates call origination problems and lack of billing synchronization, but also requires the service provider to track billing information by using multiple databases and other means so that the subscriber of the service can be properly billed for the service.

In contrast, the exemplary embodiment of the present invention does not instruct the SCN 42 to reoriginate the call for routing to the forwarded location (14c) designated by the subscriber. Instead, the SCN 42 dials a feature access code as a part of a Custom Dialing Plan (CDP) and string of digits containing call information that needs to be corrected. Specifically, the SCN 42 dials the feature access code associated with the CDP assigned to outbound lines on the SCN 42. The SSP 12b detects the feature access code based on a CDP trigger. Consequently, the SSP 12b sends a TCAP message containing the feature access code and appended digits in the data string to the SCP 26.

The exemplary embodiment of the present invention is capable of accommodating and processing fifty (50) digits, as opposed to only twenty (20) digits in the prior art system. Although an SSP is capable of accommodating a maximum of thirty-two appended digits, the prior art system is limited to twenty digits because the SCN maintained a twenty digit maximum when dialing. However, the present invention is capable of fully utilizing the SSP's maximum appended digits as a result of expanding the SCN's dialing limit from twenty digits to now fifty digits. Advantageously, the present invention accommodates the data needed for transmission to the SCP.

The string of digits represents information about how the call is to be configured. The feature access code and string of data are provided by a data assembly interface 44. The data assembly interface 44 is a software program located within the SCN 42 and designed for assembling blocks of information or data. The data assembly interface 44 assembles the information obtained from the ISDN call set-up message, the records of the subscriber, and the location to route the call in a special format for automatic transmission to the SCP 26. This data is populated in the TCAP message.

Specifically, the data can be assembled in the following format:

*X|CallingPartyNum|SubscriberNum|RedirectNum|# where,
*X is preferably any two digit access code,
RedirectNum is the directory number where the call is to be routed,
CallingPartyNum is the original calling party number,
SubscriberNum is the service subscriber's telephone number, and
# is a delimiter indicating the end of the data string. The delimiter, #, serves as an indication to the switch that dialing is complete and the data string should be analyzed.

In the exemplary embodiment, the call is made on an ISDN line to facilitate quick transmission of the data as a call set up message on the D-channel, rather than entering touch tones, which would take several seconds, on an analog line. In this example, assuming the feature access code is "99", the assembled string of data would consist of *99770555123477077712342164441234#, where Nora's telephone number is the directory number where the call is to be routed, Veda's telephone number is the original calling party number, and Dale's telephone number is the service subscriber's telephone number. It will be appreciated by one skilled in the art that the feature access code may be any set of digits or directory number that may be populated in the data assembly.

As previously mentioned, the feature access code and string are sent along with the communication to the switch SSP 12b. The feature access code has a CDP trigger, which is assigned to the outbound lines of the service node, for involving an SCP in the call processing. The feature access code is recognized by SSP 12b as an indicator of the special status of the communication. In other words, the feature access code typically triggers the switch to pause in the processing of the call and to obtain further instructions from other network elements, such as SCP 26. In the example, SCN's call to the feature access code is received in SSP 12b, which pauses in the processing of the communication to request instructions from the SCP 26. As part of the SSP's query to the SCP 26 for processing instructions, the SSP 12b provides the SCP 26 with information relating to the communication. In particular, the SSP 12b provides the SCP 26 with communication information including the feature access code and the calling line number. In addition, the SSP 12b provides the SCP 26 with identification information with respect to itself. This identification information may include an originating point code (OPC) or other identifier as appropriate.

In response to receiving the communication information and the identification information from the SSP 12b, the SCP 26 carries out certain functions. The SCP 26 recognizes the feature access code as indicative that the communication contains a string of data that the SCP 26 must process. The SCP 26 is responsible for reformatting the call data so that billing information is synchronized and original calling party information is maintained. The SCP 26 checks its database 30 for information on how to handle the string of data, and based on the information obtained, the SCP 26 reassembles this string of data. The SCP 26 then instructs the SSP 12b, in a response message, to route the call with the following instructions:

Calling Party Parameter=7705551234;

Called Party Parameter=7707771234;

Redirecting Party Parameter=2164441234; and

Billing Party Parameter=SCN number.

Based on the instructions provided by the SCP 26, the call is routed to SSP 12a with the fields populated as indicated. Once the call is routed to SSP 12a, another TAT trigger is encountered for the service. At this point, the SSP 12a assembles call data as previously described for submission to the SCP 26. The SCP 26 evaluates the call data and denotes that the Bill Party Parameter is the SCN number of SCN 42 and that the final stage of data manipulation is needed to route the call. The SCP 26 then provides instructions to the SSP 12a to route the call as follows:

Set Called Party Parameter=redirecting party number received; and

Route Call to=redirecting party received.

When the SSP 12a receives these parameters, billing for the call is automatically charged to the subscriber's number, and the original calling party number is retained. In essence, the call data is reconstructed and returned to the subscriber's line 15b as if the SCN 42 was not involved. The call is finally routed from the SSP 12a to an SSP 12c based on the called party number in a conventional manner. Hence, Veda's call to Dale's telephone 14b is forwarded to Nora's telephone 14c.

Advantageously, the exemplary embodiment of the present invention provides automatic synchronization of billing information so that a subscriber can be directly billed for use of an enhanced communication service. Several databases and other equipment are no longer needed to reconcile billing information, thereby improving efficiency and cutting costs. Moreover, the present invention also resolves call origination problems, in addition to billing problems, by providing a standard method for processing long strings of data representing information on how a call is to be processed and by reformatting the data fields based on this information so that the final call structure resembles that of the original call structure.

With continuing reference to FIGS. 1 and 2 and now turning to FIG. 3, the process by which a call is forwarded to another location while preserving calling and billing information is described in the form of a timing diagram. FIGS. 4a–4d are introduced as appropriate for demonstrating the reorganization of call data as the call is processed.

In step 100, a calling party places a call using the telephone 14a to a called party telephone 14b. The call is set up for transmission to the called party telephone 14b by a switch, SSP 12a, serving the calling and called party lines. The calling party number and the called party number, as well as other data, such as identification and routing information are shown in FIG. 4a. In step 105, the call is en route to the called party telephone 14b. However, a TAT trigger is detected associated with the called party line indicating that a service has been activated. The SSP 12a halts the call processing to obtain instructions regarding how to proceed with the call (step 115).

In response to the query provided by SSP 12a, in step 120, SCP 26 performs a search in database 30 and determines that the communication is to be routed to SCN 42. SCP 26 then provides instructions to SSP 12a to route the communication to the SCN 42 via SSP 12b. Next, in step 125, SSP 12a routes the communication to SSP 12b. Referring to FIG. 4b, the ISUP message maintains the calling party number. However, the called party number changes to the SCN number of SCN 42 and a redirect number and billing party number, both contain the initial called party number.

Once the processing instructions are routed to SSP 12b, the SSP 12b routes the communication in a conventional manner to the SCN 42 (step 130). The SCN 42 receives an ISDN call set-up message from the subscriber's line, locates the records of the subscriber in a database, and extracts the location to route the call from the database, as previously described in connection with FIG. 2. In addition, the SCN 42 dials a feature access code and a string of digits, which are populated in the TCAP message, as also previously described in connection with FIG. 2.

In step 135, the feature access code and string of data are transmitted to the switch SSP 12b. The feature access code is received in SSP 12b, which pauses in the processing of the communication to request instructions from the SCP 26. A query containing the feature access code and string of data is then transmitted to the SCP 26 (step 140). The SCP 26 recognizes the feature access code, checks its database 30 for instructions for processing the string of data, and reassembles the string of data in accordance with the instructions. In step 145, the SCP 26 instructs the SSP 12b, in a response message, to route the call having parameters as set forth in FIG. 4c.

FIG. 4c illustrates the TCAP message maintaining the same calling party number as in FIGS. 4a and 4b with respect to steps 100 and 125, respectively. In addition, the called party number changes to the same called party number as in FIG. 4a in connection with step 100. The redirect number changes to the directory number of the telephone to which the call is actually being forwarded. The billing party number changes to the SCN number of the SCN 42.

In step 150, the call is routed from SSP 12b to SSP 12a with the fields populated as indicated. A TAT trigger is again encountered in connection with SSP 12a, and SSP 12a, in turn, routes the call to the SCP 26 (step 155). Because the SCN number of SCN 42 is found in the billing party number parameter, in step 160, the SCP 26 provides instructions to the SSP 12a to route the call having parameter rearranged in accordance with FIG. 4d.

In FIG. 4d, the calling party number remains unchanged, the called party number changes to that of the final routing telephone number, the redirect number changes to the called party number, and the billing party number is no longer needed.

Finally, in step 165, the call is routed from the SSP 12a to an SSP 12c based on the called party number in a conventional manner. Thus, the call is ultimately forwarded to the telephone 14c (step 170).

Based on the foregoing, billing for the call is automatically charged to the subscriber's number, and the original calling party number is retained.

Conclusion

The present invention provides the basis for synchronizing billing information and maintaining call origination information. Specifically, data is manipulated during various stages of call processing so as to maintain the integrity of the call structure. The process of manipulating data is due in significant part to the use of a feature access code and call information that needs to be corrected. The feature access code has an associated trigger for involving an SCP in the call processing. The SCP is responsible for reformatting the call data so that billing information is synchronized and original calling party information is maintained.

Alternative embodiments will become apparent to those skilled in the art to which the present invention pertains without departing from its spirit and scope. Accordingly, the scope of the present invention is defined by the appended claims rather than the foregoing description.

What is claimed is:

1. A method for maintaining an original calling party number associated with a communication as the communication is routed through a telecommunications system including routine through a network device, which routing would otherwise change the original calling party number, so the original calling party number appears as a calling party number at an ultimate network element serving an ultimate destination of the communication, comprising:

receiving communication information for parameters of a call structure associated with the communication, the communication information including the original calling party number and an original called party number;

in response to receiving the communication information, using the communication information to change information within the parameters of the call structure to effectuate routing of the communication through the telecommunications system to a network element serving the original called party number;

as a result of the routing of the communication to the network element serving the original called party number, receiving call data related to the communication; and in response to receiving the call data, effectuating inclusion of the original calling party number as a calling party number within the parameters of the call structure as the communication is routed to the ultimate network element serving the ultimate destination of the communication, whereby the use of the communication information to change the information in the call structure retains the original calling party number with the communication and receipt of the call data enables the inclusion of the original calling party number with the communication at the ultimate network element serving the ultimate destination.

2. The method of claim 1, wherein the communication information comprises a redirect number, and a billing party number.

3. With respect to a communication that is routed from a network device that otherwise would cause substitution of a number of the network device for an original calling party number associated with the communication, a method for making the original calling party number available as a calling party number at an ultimate network element serving an ultimate destination of the communication, comprising:

causing the communication to be routed from a network device to a network element, the communication being associated with call data including a data manipulation identifier;

receiving the call data associated with the communication from the network element, the call data including the data manipulation identifier;

in response to the data manipulation identifier, effectuating inclusion of the original calling party number as the calling party number in a call structure of the communication at the ultimate network element serving the ultimate destination of the communication, whereby the receipt of the call data including the data manipulation identifier results in inclusion of the original calling party number as the calling party number at the ultimate destination as if the communication had not been routed from the network device.

4. The method of claim 3 wherein the call data comprises a billing party number; wherein the billing party number comprises the data manipulation identifier; and wherein the data manipulation identifier comprises an identification for the network device from which the communication is routed.

5. With respect to a communication being routed through a telecommunications system including routing through a network device, which routing would otherwise chance the original calling party number, a system for maintaining original calling party information when providing an enhanced communication service, comprising:

the first network element operative to assemble a string of data containing a feature access code and call information for correction of parameters within a call structure of the communication;

the first network element being further operative to transmit the string of data to a second network element;

the second network element operative to receive the string of data including the feature access code and to recognize the feature access code;

in response to recognizing the feature access code, the second network element being further operative to populate the call information into the parameters of the call structure so as to effectuate routing of the communication through the telecommunications system to a third network element serving the original called party number;

as a result of the routing of the communication to the third network element causing the second network element to receive call data related to the communication; and in response to receiving the call data, causing the second network element to effectuate inclusion of the original calling party information as a calling party information within the parameters of the call structure as the communication is routed to an ultimate network element serving an ultimate destination of the communication, whereby use of the call information in populating the parameters of the call structure and the use of the call data retains original calling party information located in the call structure associated with the communication.

6. In a telecommunications system having functionally interconnected network elements including service switching points (SSPs), a service control point (SCP), and a service node (SN), a method to retain an original calling party number associated with a communication as a calling party number at an ultimate destination of the communication, even when the communication, prior to the communication being routed to the ultimate destination, is routed from an original called party number to a called party number associated with the SN, the method comprising:

A. causing the SN, in response to receipt of the communication directed to the called party number associated with the SN, to make a call by dialing a feature access code (FAC) followed by the SN dialing a string of digits, the string of digits including call information for parameters of call structure of the communication;

B. causing an SSP serving the SN, in response to receiving the call dialed to the FAC and dialed to the string of digits from the SN, to send a first query to the SCP, the first query including the FAC and the string of digits;

C. causing the SCP, in response to receiving the first query including the FAC and the string of digits, to provide parameter instructions with respect to the parameters of the call structure of the communication, the parameter instructions being provided to the SSP serving the SN, the parameter instructions instructing the SSP serving the SN to:
  i. cause a calling party number parameter of the call structure of the communication to include the original calling party number associated with the communication, and
  ii. cause a billing party number parameter of the call structure of the communication to include an identification of the SN;

D. causing the SSP serving the SN, in response to the parameter instructions from the SCP, to carry out the parameter instructions, and then to route the communication to the original called party number;

E. causing an SSP serving the original called party number, in response to receiving the communication from the SSP serving the SN, to make a second query of the SCP, the second query including the identification of the SN in the billing party number parameter of the call structure of the communication;

F. causing the SCP, in response to the second query including the identification of the SN in the billing party number parameter of the call structure of the communication, to provide the SSP serving the original called party number with routing instructions to route the communication to the ultimate destination; and G. causing the SSP serving the original called party number, in response to the routing instructions, to route the communication to the ultimate destination, whereby the original calling party number is retained as the calling party number at the ultimate destination by causing the SN to provide the call information in the string of data provided to the SCP so the SCP may provide the parameter instructions so as to cause the call structure of the communication to reflect the original calling party number as the calling party number at the ultimate destination of the communication.

7. The method of claim 6,
wherein in action C, the parameter instructions instructing the SSP serving the SN further instruct the SSP serving the SN to:
  iii. cause a called party number parameter of the call structure of the communication to include the original called party number; and
wherein in action D, the SSP is caused to carry out the parameter instructions, and caused to route the communication to the original called party number on the basis of the called party number parameter including the original called party number.

8. The method of claim 7,
wherein in action C, the parameter instructions instructing the SSP serving the SN further instruct the SSP serving the SN to:
  iv. to cause a redirect number parameter of the call structure of the communication to include the ultimate destination of the communication; and
wherein in action D, the SSP is caused to carry out the parameter instructions.

9. The method of claim 6, wherein the ultimate destination comprises a forwarded destination.

10. The method of claim 6,
wherein action F comprises causing the SCP, in response to the second query including the identification of the SN in the billing party number parameter of the call structure of the communication, to provide more parameter instructions with respect to the parameters of the call structure of the communication, the more parameter instructions being provided to the SSP serving the original called party number, the more parameter instructions instructing the SSP serving the original called party number to:
  a. cause the called party number parameter of the call structure of the communication to include a number of the ultimate destination, so as to provide the routing instructions to the SSP serving the original called party number to route the communication to the ultimate destination; and
wherein in action G, the SSP serving the original called party number is caused to route the communication to the number of the ultimate destination on the basis of the called party number parameter including the number of the ultimate destination.

11. The method of claim 6, wherein action F comprises:
causing the SCP, in response to the second query including the identification of the SN in the billing party number parameter of the call structure of the communication, to provide more parameter instructions with respect to the parameters of the call structure of the communication, the more parameter instructions being provided to the SSP serving the original called party number, the more parameter instructions instructing the SSP serving the original called party number to:
  a. cause a redirect number parameter of the call structure of the communication to include the original called party number; and
wherein action G comprises causing the SSP serving the original called party number, in response to the more parameter instructions, to include the original called party number in the redirect number parameter of the call structure of the communication,
whereby, on the basis of inclusion of the original called party number in the redirect number parameter of the call structure of the communication as the communication is routed to the ultimate destination, billing information related to the communication may be synchronized to an associated subscriber of the original called party number.

12. In a telecommunications system having functionally interconnected network elements including a service control point (SCP) and a service node (SN), a method to retain an original calling party number associated with a communication as a calling party number at an ultimate destination of the communication, even when the communication, prior to the communication being routed to the ultimate destination, is routed from an original called party number to a called party number associated with the SN, the method comprising:
  A. causing the SN, in response to receipt of the communication directed to the called party number associated with the SN, to dial a string of digits, the string of digits including call information for the communication;

B. causing the string of digits to be provided to the SCP;

C. causing the SCP to use the call information included in the string of digits to effectuate routing of the communication to the original called patty number;

D. as a result of the routing of the communication to the original called party number, causing the SCP to receive an identification of the SN in association with a query related to the communication;

E. causing the SCP, in response to the query associated with the identification of the SN, to effectuate routing of the communication to the ultimate destination, and to cause the communication to reflect the original calling party number as the calling party number at the ultimate destination of the communication, whereby the original calling party number is retained as the calling party number at the ultimate destination by causing the SN to provide the call information in the string of data received by the SCP so the SCP may cause the communication to reflect the original calling party number as the calling party number at the ultimate destination of the communication.

13. The method of claim 12, wherein action E comprises;

causing the SCP, in response to the query associated with the identification of the SN, a. to effectuate routing of the communication to the ultimate destination, b. to cause the communication reflect the original calling party number as the calling party number at the ultimate destination of the communication, and c. to cause the communication be associated with the original called party number, whereby, on the basis of association of the original called party number with the communication as the communication is routed to the ultimate destination, billing information related to the communication may be synchronized to an associated subscriber of the original called party number.

* * * * *